A. INGSTROM.
RAILROAD CAR CONSTRUCTION.
APPLICATION FILED APR. 29, 1913.
1,106,873.
Patented Aug. 11, 1914.
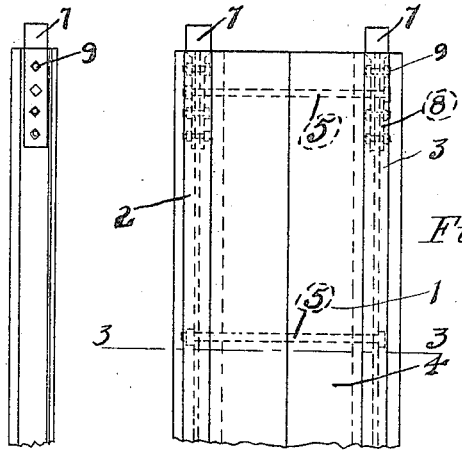
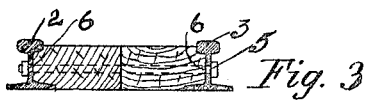
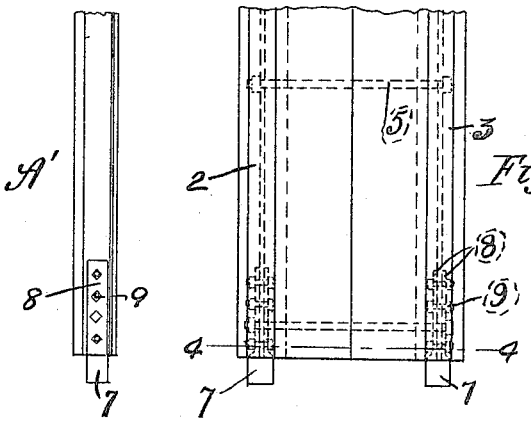
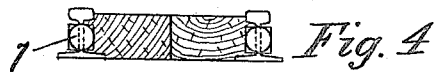
WITNESSES
INVENTOR
ATTORNEY

UNITED STATES PATENT OFFICE.

ALBIN INGSTROM, OF MECHANICSVILLE, NEW YORK.

RAILROAD-CAR CONSTRUCTION.

1,106,873.  Specification of Letters Patent.  Patented Aug. 11, 1914.

Application filed April 29, 1913. Serial No. 764,471.

*To all whom it may concern:*

Be it known that I, ALBIN INGSTROM, a citizen of Finland, residing at Mechanicsville, in the county of Saratoga and State of New York, have invented certain new and useful Improvements in Railroad-Car Construction, of which the following is a specification.

This invention relates to certain new and useful improvements in vehicle body structures and more particularly to the construction of the side boards of railroad and other cars or vehicles used for transporting heavy loads.

The invention has for an object to provide side boards for vehicles, car bodies, and the like which are economically and simply constructed and capable of withstanding great strain.

Other and further objects and advantages of the invention will be hereinafter set forth and the novel features thereof defined by the appended claim.

Figure 1 is a longitudinal section, broken away, of the forward end of the side board; Fig. 2 is a similar view of the rear portion of the side board; Fig. 3 is a section taken on line 3—3 of Fig. 1; Fig. 4 is a section taken on line 4—4 of Fig. 2; Fig. 5 is a longitudinal section, broken away, of one end of the I beam showing the fastening bolt secured thereto; and Fig. 6 is a similar view, of the other end of the I beam.

Like numerals of reference refer to like parts in the several figures of the drawings.

In the drawings, the numeral 1 indicates my improved construction of said panel for vehicles comprising spaced I-beams 2 and 3 of any desired material, such as standard rolled steel rail or railroad rail, forming guard and stringer members for the top and bottom of a plank or suitable steel plate 4 arranged between the I beams and secured thereto by means of headed bolts 5 or other fastening means passed through alining apertures 6 formed in the I-beams and intervening plank or plate, wherein they are held by means of nuts, as clearly shown. The edges of the plank or plate are so shaped as to conform to that of the adjoining I-beam, and by providing a sufficient number of bolts 5, it will readily be seen that a strong and durable vehicle box side is formed and one wherein the securing means are not exposed to the injurious effects of moisture as is the case with the usual paneled type of vehicle side.

As a means for securing the sides within a vehicle box, bolts or splice bars 7, each having a bifurcated end 8, are or may be utilized, the web of the I beam being adapted for reception within the bifurcated end where it is secured by means of bolts, rivets and the like as shown at 9 in Figs. 1, 2, 5, and 6. The projecting ends 10 of the bolts 7, may be fastened to the head and end gate of the body (not shown) in any desired manner.

The invention presents a simple, efficient and economically constructed form of side board for vehicle or car bodies adapted to withstand great strain and at the same time present a neat and finished appearance.

What I claim is:

In a side panel for vehicles the combination with spaced rail sections of vertically arranged side plates therebetween the edges of said plates adapted to contact the rail section being shaped to receive and make a tight joint therewith, alining apertures through the webs of said rail sections, and side boards and headed bolts extending through and of bars having bifurcated ends adapted to fit over the ends of the web of said rail sections and adapted to be secured thereto as and for the purpose described.

In testimony whereof I affix my signature in presence of two witnesses.

ALBIN INGSTROM.

Witnesses:
 JEREMIAH FIELDS,
 G. F. DURYEE.